United States Patent [19]
Piccolo et al.

[11] 3,812,241
[45] May 21, 1974

[54] PROCESS FOR PREPARING ALUMINUM TRICHLORIDE

[75] Inventors: Luigi Piccolo, Milan; Marcello Ghirga, Bresso; Benedetto Calcagno, Milan, all of Italy

[73] Assignee: Societa Italiana Resine S.I.R. S.p.A., Milan, Italy

[22] Filed: Apr. 24, 1972

[21] Appl. No.: 246,784

[30] Foreign Application Priority Data
Apr. 30, 1971 Italy.................................. 23910/71

[52] U.S. Cl.................. 423/495, 423/135, 423/136, 423/659
[51] Int. Cl. ............................................. C01f 7/58
[58] Field of Search ............ 423/495, 135, 136, 659

[56] References Cited
UNITED STATES PATENTS
3,222,127   12/1965   Wilson................................ 423/495

FOREIGN PATENTS OR APPLICATIONS
939,241   10/1963   Great Britain...................... 423/495

Primary Examiner—Edward Stern
Attorney, Agent, or Firm—Sughrue, Rothwell, Mion, Zinn & Macpeak

[57] ABSTRACT

Anhydrous aluminium chloride is made by the action of chlorine or gaseous hydrogen chloride on a fluidised bed of aluminium particles in the presence of a powdered inert material having a specific surface area of 0.01 to 0.1 sq.m/g and a bulk density of 1.1 to 2.4 g/cc.

6 Claims, No Drawings

PROCESS FOR PREPARING ALUMINUM TRICHLORIDE

The present invention relates to an improved process for the manufacture of anhydrous aluminium trichloride by the action of chlorine or gaseous hydrogen chloride or a mixture of both on solid aluminium, using the fluidised bed technique.

Aluminium trichloride is a product which is very useful in industry, particularly as a catalyst in Friedel-Crafts reactions, and it may be produced by the reaction of chlorine on a mixture of bauxite and carbon. The carbon acts as a reducing agent on the bauxite and the oxygen supplied together with the chlorine combines with the excess carbon to provide the heat necessary for reaction. By means of this process, fairly impure aluminium trichloride is obtained, with a grade of approximately 95 percent. A product of greater purity is obtained by another process known in the art whereby the gaseous chlorine is fed over molten aluminium, and aluminium trichloride sublimes and condenses in view of the temperature conditions under which chlorination occurs. More particularly, the aluminium trichloride is collected in appropriate condensers in which it accumulates in the form of crystals which are periodically removed, crushed, sieved and placed in steel containers.

Such a process requires rather complex apparatus and has disadvantages arising from the use of extremely corrosive products, due to the high temperatures required in the chlorination of the molten aluminium.

Furthermore, the aluminium trichloride produced takes the form of granules and is therefore rather unsuitable as a catalyst in Friedel-Crafts reactions.

In order to avoid these drawbacks, the prior art has resorted to chlorination, using gaseous chlorine, of solid aluminium in the form of fluidised particles. In this way, compared with the bauxite processes, a purer form of aluminium trichloride is obtained and, furthermore, the following advantages are enjoyed compared with the processes which employ the aluminium in its molten state:

working temperature substantially lower so that there is less attack on the materials of the reactor, hence an absence of scale and products of a lower degree of chlorination arising from the attack of aluminium on aluminium trichloride;

greater regularity in the desublimation with a consequent formation of an aluminium trichloride which is better suited as a catalyst in that it consists of fine and homogenous powder;

substantial simplification of the apparatus.

However, the attempts hitherto undertaken to provide a fluidised bed of particles of aluminium have not enjoyed success, principally by virtue of the localised super-heating which occurs in the reaction of chlorine with aluminium in granules. Under these conditions, in fact, the aluminium undergoes a process of incipient fusion, so that the various granules of the aluminium become bonded to one another, forming agglomerates, even of substantial dimensions. The fluidisation system is thus impaired and continuous operation is rendered impossible.

It has now been found possible to eliminate the disadvantages of the prior art in the manufacture of aluminium trichloride by the action of chlorine or gaseous hydrogen chloride or a mixture of both on solid aluminium, using the fluidised bed technique. It is therefore an object of the present invention to provide a more effective method of producing aluminium trichloride by chlorination of solid aluminium by means of the fluidised bed technique.

Another object of the present invention is to provide a very homogenous fluidised bed of aluminium particles in which agglomerates do not form among the particles of aluminium due to localised superheating during chlorination.

Further objects and particular features of the invention will become apparent from the ensuing description and examples.

The process of the present invention consists essentially in using chlorine or gaseous hydrogen chloride or a mixture of both for chlorinating solid aluminium in the form of fluidised particles in the presence of a powdered inert material having a specific surface area of 0.01 to 0.1 sq.m/g and a bulk density of 1.1 to 2.4 g/cc. More particularly, according to the process of the present invention, the particles of aluminium, having a granulometry of less than 1.5 mm and preferably between 0.18 and 1.0 mm, and the particles of inert material, having a granulometry below 0.5 mm and preferably between 0.06 mm and 0.18 mm, are subjected to chlorination on the fluidised bed principle using a stream of inert gas, for example nitrogen, and chlorinating gas, which enters at the bottom of the reactor. The aluminium content of the aluminium-inert material mixture may vary from 2 percent to 60 percent by weight according to the conditions of temperature, concentration of the chlorinating gas and residence time of the latter in the reactor; however, for performance on an industrial scale of operation, it is preferable to maintain the aluminium content of the mixture at 8 percent to 25 percent by weight. The choice of the inert material constitutes the essential aspect of this process; indeed, of the substances which are not attacked by chlorine or hydrogen chloride under the conditions in which the process is carried out, only those with a specific surface area of between 0.01 and 0.1 sq.m/g and a bulk density of 1.1 to 2.4 g/cc allow aluminium to be successfully chlorinated in a fluidised bed. In contrast, the desired result cannot be obtained if the inert materials used have a specific surface area or bulk density which are outside of the above-mentioned ranges.

In some processes proposed, it is suggested to use fluidised beds comprising inter alia inert materials, but the similarity existing between such process and that of the present invention is only a seeming one, the methods and procedures of usage being substantially different in the two cases. For example, in certain catalytic processes, fluidised beds have been used which consist of a catalyst supported on inert material in order to reduce the activity of the catalyst. In the process of the present invention, on the other hand, the function of the inert material is rapidly to dispel the excess of heat produced by the reaction in order to avoid agglomeration of the bed due to incipient fashion of the aluminium, and therefore to maintain homogenous fluidisation of the particles of aluminium.

It is possible advantageously to use as inert materials suitable for the purposes of the present invention native rutile, powdered quartz, native zirconia, or crushed fused silica alumina materials. The reaction is carried out in a range of temperatures comprised between the temperature of sublimation of aluminium chloride (178°C) and the melting temperature of aluminium (600°C) and preferably in the range from 200° to 400°C, with residence times of 0.1 to 10 seconds and preferably from 0.3 to 8 seconds.

By proceeding in this way, it is possible rapidly to get rid of the excess of heat produced by the reaction, by the use of heat exchangers or by recycling cold inert material and so controlling the temperature.

Furthermore, the density of the particles of inert material is fairly high to prevent such particles being entrained in the stream of gaseous aluminium chloride, so that it is possible to obtain aluminium chloride which is free from impurities without having to install special systems of separation. The apparatus used is therefore very simple and easily controlled and, since the process is occurring at not very high temperatures, it is possible to construct such apparatus from common metals.

The present invention will now be illustrated by the following examples. Example 6 is given by way of comparison.

EXAMPLE 1

Into a tubular glass reactor with an inside diameter of 44 mm and fited with a porous baffle for the distribution of the gas at the base of the reaction bed are charged 690 g native rutile with a granulometry from 0.062 to 0.25 mm, with a bulk density of 2.1 g/cc and a specific surface area of 0.06 sq.m/g, and 76 g of aluminium with a granulometry from 0.177 to 1.0 mm, having a specific surface area of 1.1 sq.m/g and an aluminium metal content equal to 93.2 percent by weight, the remainder consisting essentially of aluminium oxide, carbon residues and metallic impurities. The mixture of powders is fluidised in a stream of nitrogen with a throughput of 90 normal litres per hour and heated to 300°C.

During this pre-heating phase, it was observed that the aluminium granules mixed with the rutile granules were distributed very homogenously through the fluidised bed.

Subsequently, chlorination was started by introducing into the reactor a stream of gaseous hydrogen chloride at a rate equal to 91 Nl/hr and the temperature was regulated by a system of air cooling of the outer wall of the reactor.

During an overall period of 4 hours, four tests were carried out, a quantity of powdered aluminium equal to the quantity consumed by reaction being supplied continuously, the temperature being successively raised to 330°, 370°, 400° and 420°C. For the conversion of hydrogen chloride, the following values were respectively obtained: 90 percent, 96.5 percent, 100 percent, 100 percent.

After desublimation in a column and cooling by air, aluminium chloride was obtained in the form of finely sub-divided powder with a degree of purity equal to 99.5 percent by weight.

The final mixture in the reactor was discharged and observed under a microscope: there was no indication of agglomeration of the particles in the bed.

EXAMPLE 2

104.5 g native rutile with a granulometry from 0.062 to 0.177 mm and 53.5 g aluminium with a granulometry from 0.177 to 0.84 mm, having the same properties as the sample used in Example 1, were charged to a reactor identical to that in Example 1.

The mixture of powders was fluidised in a stream of nitrogen at a throughput equal to 300 Nl/hr and pre-heated up to 200°C. In this case, too, optimum fluidisation and homogenous distribution of the aluminium in the fluidised bed were observed.

Subsequently, chlorination was started by introducing gaseous hydrogen chloride into the reactor at the rate of 140 Nl/hr mixed with nitrogen at the rate of 150 Nl/hr.

It was observed that already at the temperature of 200°C, the reaction was proceeding at a high speed.

During an overall period of 5 hours, three tests were carried out, the temperature being successively raised to 240°, 295° and 350°C.

For the conversion of hydrogen chloride, the following values were obtained: 91.2 percent, 99.5 percent and 100 percent respectively.

EXAMPLE 3

249.5 g native rutile with a granulometry from 0.062 to 0.177 mm and 20 g aluminium with a granulometry from 0.177 to 0.84 mm, having the same characteristics as the samples used in Example 1, were charged to a reactor identical to that used in Example 1.

The mixture of powders was fluidised in a stream of nitrogen at the rate of 152 Nl/hr and pre-heated to 200°C. Subsequently, chlorination was commenced by introducing chlorine into the reactor at the rate of 37 Nl/hr and nitrogen at the rate of 152 Nl/hr.

By working in a range of temperatures from 200° to 230°C, a chlorine conversion rate of 95.7 percent was achieved.

By working at temperatures of 290° and 300°C, the chlorine conversion rates observed were: 99.4 percent and 100 percent respectively. The final mixture in the reactor was discharged and observed under a microscope: no sign of sintering or agglomeration of the particles of the bed was observed.

EXAMPLE 4

169 g native rutile with a granulometry from 0.062 to 0.177 mm and 45 g aluminium with a granulometry from 0.177 to 0.84 mm were charged to a reactor identical to that in Example 1. The mixture of powders was fluidised in a stream of nitrogen at the rate of 152 Nl/hr and pre-heated to 250°C.

Subsequently, chlorination was commenced by introducing chlorine into the reactor at a rate of 37 Nl/hr and nitrogen at a rate of 152 Nl/hr.

During an overall period of 12 hours, one test was carried out in a range of temperatures from 250° to 260°C, a constant chlorine conversion equal to 98.4 percent being obtained. When a working temperature of 300°C was used, a chlorine conversion equal to 100 percent was observed.

EXAMPLE 5

22.5 g aluminium with a granulometry from 0.177 to 0.84 mm having the same properties as the sample in Example 1 and 50.5 g of powdered quartz with a granulometry from 0.088 to 0.25 mm, a bulk density equal to 1.15 g/cc and a specific surface area equal to 0.015 sq.m/g were charged to a reactor identical to that in Example 1. The mixture of powders was fluidised in a stream of nitrogen at the rate of 150 Nl/hr and preheated to 300°C.

In this case also, an homogenous distribution of the aluminium in the fluidised bed was observed. Subsequently, chlorination was commenced by injecting into the reactor a stream of gaseous hydrogen chloride at the rate of 140 Nl/hr and nitrogen equal to 150 Nl/hr. During a period of 10 hours, tests were carried out at the temperatures of 300°, 380° and 400°C, the following respective hydrogen chloride conversion rates being obtained: 75 percent, 97.4 percent and 99.4 percent. The final mixture of reaction was discharged and observed under a microscope: there was no indication of agglomeration or sintering of the particles of the bed.

EXAMPLE 6 (Comparative)

Using the reactor and procedures according to Example 1, a series of tests was performed using as inert material Florex LVM (trade mark of the Floridin Company), a silica alumina material with a bulk density of 0.57 g/cc and a specific surface area equal to 150 sq.m/g, and calcined alumina with a bulk density of 0.9 g/cc and a specific surface area of 2.5 sq.m/g.

In this series of tests, the following phenomena were observed:

low chlorine conversion rates;
unsatisfactory fluidisation and non-homogenous distribution of the powdered aluminium throughout the fluidised bed;
localised super-heating due to the reaction being performed in a localised fashion;
agglomeration of the particles in the fluidised bed, excluding any opportunity of using such inert materials in continuous chlorination plants for production on an industrial scale.

What we claim is:

1. Process for the manufacture of non-agglomerated anhydrous aluminium trichloride by the action of chlorine or gaseous hydrogen chloride or a mixture of both on solid aluminium, using the fluidized bed technique, characterised in that the solid aluminium in the form of fluidized particles with a granulometry below 1.5 mm is chlorinated in the presence of a powdered inert material with a granulometry below 0.5 mm, with a specific surface area of 0.01 to 0.1 sq.m/g and a bulk density of 1.1 to 2.4 g/cc, the aluminium content of the mixture being from 2 percent to 60 percent by weight, at a temperature from 178° to 600°C, the residence times of gas within the fluidized bed ranging from 0.1 to 10 seconds, a flow of inert gas and chlorinating gas being supplied at the bottom of the reactor.

2. A process according to claim 1, characterised in that the aluminium content is 8 percent to 25 percent by weight.

3. A process according to claim 1, characterised in that the inert materials used are native rutile, powdered quartz, native zirconia, or crushed fused silica alumina materials.

4. A process according to claim 1, characterised in that aluminium particles are used having a granulometry from 0.18 to 1.0 mm.

5. A process according to claim 1, characterised in that inert materials are used which have a granulometry from 0.06 to 0.18 mm.

6. A process according to claim 1, characterised in that chlorination is carried out at a temperature of 200° to 400°C, with residence times from 0.3 to 8 seconds.

* * * * *